US009614708B1

(12) United States Patent
Mohamed et al.

(10) Patent No.: US 9,614,708 B1
(45) Date of Patent: Apr. 4, 2017

(54) [HEW] SPATIAL MODULATION TECHNIQUE WITH DIFFERENT SOURCE-ENCODED DATA SERVICES OF THE NEXT GENERATION WLAN IEEE 802.11AX

(71) Applicant: INTEL IP CORPORATION, Santa Clara, CA (US)

(72) Inventors: Ahmed Gamal Helmy Mohamed, Santa Clara, CA (US); Thomas J. Kenney, Portland, OR (US); Shahrnaz Azizi, Cupertino, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/976,271

(22) Filed: Dec. 21, 2015

(51) Int. Cl.
*H04L 1/02* (2006.01)
*H04L 27/26* (2006.01)
*H04B 7/04* (2017.01)

(52) U.S. Cl.
CPC .......... *H04L 27/2608* (2013.01); *H04B 7/04* (2013.01); *H04L 27/2627* (2013.01)

(58) Field of Classification Search
CPC .... H04L 27/2608; H04L 27/2627; H04B 7/04
USPC ................. 375/267, 259; 714/755
See application file for complete search history.

(56) References Cited

U.S. PATENT DOCUMENTS

| | | | | |
|---|---|---|---|---|
| 2006/0248563 A1* | 11/2006 | Lee | ........................ | H04H 20/33 725/117 |
| 2007/0260958 A1* | 11/2007 | Li | ........................ | H04L 1/0048 714/755 |
| 2012/0051447 A1* | 3/2012 | Qi | ........................ | H04L 1/0009 375/259 |

OTHER PUBLICATIONS

Mesleh, Raed Y., et al. "Spatial Modulation" IEEE Transactions on Vehiclular Technology, vol. 57, No. 4, Jul. 2008.

\* cited by examiner

*Primary Examiner* — Daniel Washburn
*Assistant Examiner* — Fitwi Hailegiorgis
(74) *Attorney, Agent, or Firm* — Jason H. Vick; Sheridan Ross, PC

(57) ABSTRACT

One exemplary embodiment provides an efficient method and architecture that allows the transmission of at least two different data services with different quality of service (QOS) and source encoding for the IEEE 802.11.ax-HEW (and beyond, 802.11ax+) Wi-Fi systems/networks. An exemplary embodiment capitalizes on the behavior of spatial modulation (SM-OFDM) transmission techniques to allow, for example, using different channel encoding rates for each category/service of data.

22 Claims, 5 Drawing Sheets

US 9,614,708 B1

[HEW] SPATIAL MODULATION TECHNIQUE WITH DIFFERENT SOURCE-ENCODED DATA SERVICES OF THE NEXT GENERATION WLAN IEEE 802.11AX

TECHNICAL FIELD

An exemplary embodiment is directed toward wireless networks and communications. Some embodiments related to wireless networks that operate in accordance with one of the Institute of Electrical and Electronic Engineers (IEEE) 802.11 standards, such as the IEEE 802.11-WLAN standards. Some embodiments relate to a wireless network communicating using wireless local area networks (WLAN). Exemplary embodiments also relate to spatial modulation techniques in a WLAN environment.

BACKGROUND

Next-generation wireless networks target dense deployment scenarios where many heterogeneous devices, from high-end laptops, to low-power IoT (Internet of Things) devices and wearables, sometimes using different standards, must co-exist and operate reliably and efficiently. With the increased deployment of internet of things (TOT) devices and wearables, increasing the energy efficiency without increasing complexity/cost is highly desirable in future dense wireless networks.

Current Wi-Fi networks, implementing MIMO (Multiple-Input, Multiple-Output), utilize multiple RF chains and has become the norm. However, for IoT and wearable type devices this is not efficient due to size and cost constraints. The white paper entitled "Spatial Modulation for Improved Performance of Next-Generation WLAN", by A. G. Helmy, S. Azizi, T. J. Kenney, and N. Al-Dhahir, filed herewith and incorporated herein by reference in its entirety, provides a discussion of the application of the spatial modulation (SM) waveform to WLAN (commercially named Wi-Fi). In the paper, it is discussed that the SM concept is applied to the multi-input multi-output orthogonal frequency division multiplexing (MIMO-OFDM) transceiver architecture of the 802.11-WLAN standards calling it spatially-modulated OFDM (SM-OFDM) Wi-Fi. SM-OFDM helps the network access point (AP) to efficiently communicate with a diverse set of devices while addressing challenging design trade-offs between energy efficiency, implementation complexity, and overall network spectral efficiency.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1:
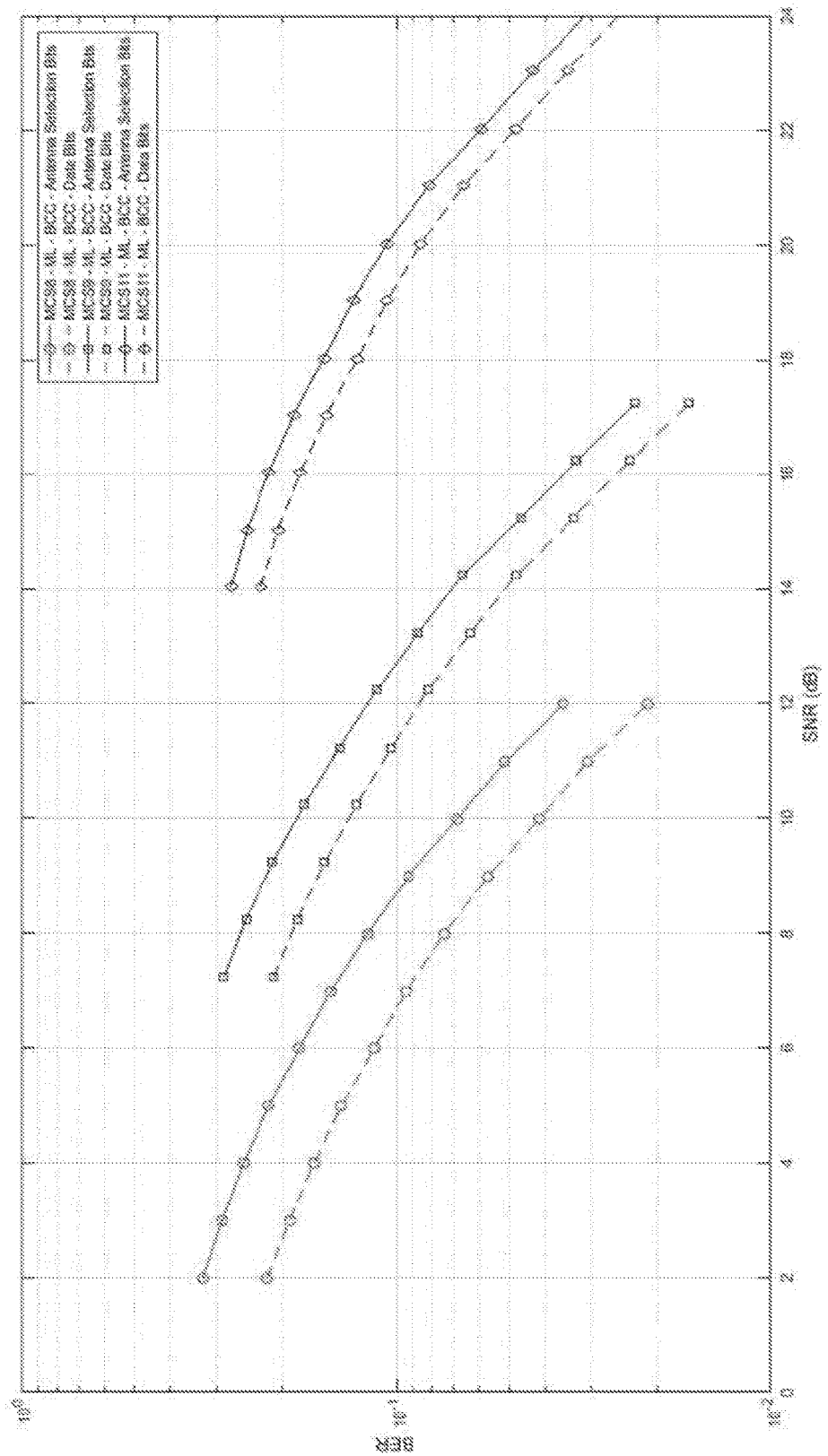
FIG. 1 illustrates unequal error performance (UEP) evaluated for the antenna selection bits and data bits using the SM-OFDM transmission technique for the IEEE 802.11 WiFi standard.

Embodiments may be implemented as part of one or more of: IEEE 802.11, IEEE 802.11 WLAN and/or the Wi-Fi Alliance® Technical Committee Hotspot 2.0 Technical Task Group Hotspot 2.0 (Release 2) Technical Specification, Version 2.04, Jan. 2, 2013. However, the embodiments are not limited to IEEE 802.11 standards or Hotspot 2.0 standards. Embodiments can be used in implementation with other wireless communications standards, protocols, and the like.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Presented herein are embodiments of systems, processes, methods, etc. The embodiments may relate to a communication device and/or communication system. The communication system can include a Wireless Local Area Network (WLAN) connection. A WLAN connection can include communication and association between two or more stations or wireless devices transmitting wide bandwidth PPDUs. The overall design and functionality of the system described herein is, as one example, a means for enhancing spatial reuse.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

One exemplary embodiment provides an efficient method and architecture that allows the transmission of at least two different data services with different quality of service (QOS) and source encoding for the IEEE 802.11.ax-HEW (and beyond, 802.11.ax+) Wi-Fi systems/networks. An exemplary embodiment capitalizes on the behavior of spatial modulation (SM-OFDM) transmission techniques to allow, for example, using different channel encoding rates for each category/service of data.

In SM-OFDM, an incoming block of coded bits at each subcarrier is divided into two information categories with unequal error protection (UEP). These two information categories are the antenna selection (AS) bit stream and the data bit stream (DS). The different error rates originate from the fact that these two information categories are transmitted via two different constellations: a spatial constellation and a signal constellation. This behavior provides a perfect degree of freedom to be used in transmitting different source-encoded data when both the high priority (HP) and the low priority (LP) information streams are jointly encoded in the spatial and in the signal domains. Additionally, the behavior could benefit the case of a service that is error tolerant (one where some errors are acceptable), and error intolerant, where errors will require retransmission.

One exemplary embodiment provides a modification and enhancement to the transmitter for an IEEE 802.11.ax transceiver to use the SM-OFDMA technique to be able to carry potentially different source-encoded data services with potentially different QOS's on each of the information categories.

One embodiment explains the different QOS behavior for each information category to selectively enhance transmission robustness in applications where different bits have different significance.

Exemplary aspects also exploit the unequal error protection behavior that was discussed in the above-referenced paper of SM-OFDMA to selectively enhance transmission robustness in applications where different bits have different significance. In SM-OFDMA, an incoming block of information bits is mapped to be transmitted from an AP (Access Point) to two information carrying entities: a symbol selected from a complex signal constellation and a unique transmit-antenna index selected from the spatial constellation denoting the transmit antenna array used to encode the information bits in the spatial domain. Thus, spatial modulation introduces the concept of the so-called three-dimensional constellation, where an independent complex plane of signal-constellation points is defined by each spatial-constellation point (i.e., the transmit antenna index).

As discussed hereinafter, a new transmitter design is provided for, for example, 802.11.ax for SM-OFDM in order to carry at least two potentially different source-encoded data services with potentially different QOS's on each information category, therefore exploiting the different QOS for each information category.

In an alternative embodiment, this system still allows for a single encoder that is shared among both bit streams, if, for example, specialized services/uses are not desired. One exemplary benefit of this design is that it enhances transmission robustness in applications where different bits have different significance. Additionally, the design allows for different channel encoding rates for each category. Doing this, as mentioned above, allows the two streams to have similar error performance in cases where different services are not required.

As discussed, one exemplary embodiment discloses the ability to transmit potentially different source-encoded data services with potentially different QOS on each information category of the SM-OFDMA transmission, thus exploiting the different error performance for each information category. The error performance of each information category in SM is determined by the antenna correlation and the line-of-sight (LOS) component for the antenna selection bits and by the minimum Euclidean distance between pairs of signal points for the data bits. Therefore, the UEP behavior of SM provides a perfect degree of freedom to enable transmitting data services with different QOS to selectively enhance transmission robustness in applications where different bits have different significance. Enabling different QOS through source encoding at the physical layer has not been possible in previous versions of the Wi-Fi standards.

To illustrate some of the exemplary advantages, FIG. 1 shows the results of a simulation which studied the IEEE 802.11 system using different information rates and antenna configurations. The cases illustrated in FIG. 1 uses a four antenna access point with two antenna clients, which is a fairly typical deployment scenario. FIG. 1 shows the unequal error performance for the antenna selection bits and complex signal constellation data bits for the IEEE channel D (the effect of the antenna correlation is more pronounced than the minimum Euclidean distance between pairs of signal points). To exploit this trait of SM, a new design of the Wi-Fi system was developed by enabling different source-encoded data services with different QOS's on each information category (antenna selection bits or data bits). This new design at least allows, for example, this UEP to be exploited and provide a different QOS for each information category. As also mentioned, it allows different code rates for the different information categories so that they have similar error performance in cases where different services are not required.

Figure 2:
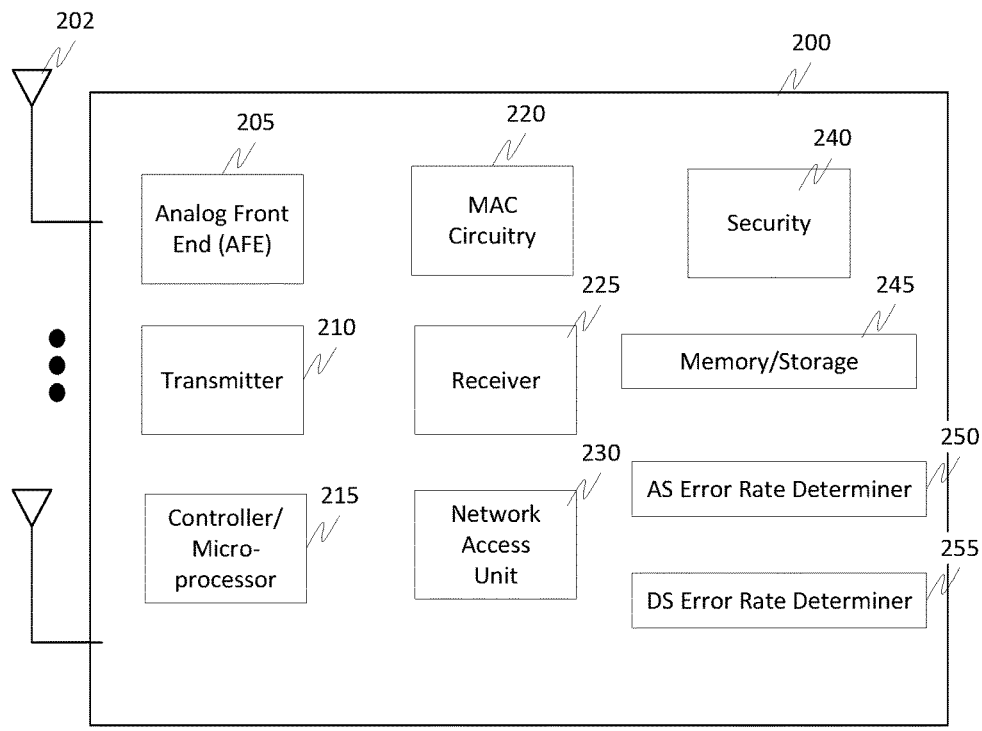
FIG. 2 illustrates a block diagram of an exemplary access point.
Figure 3:
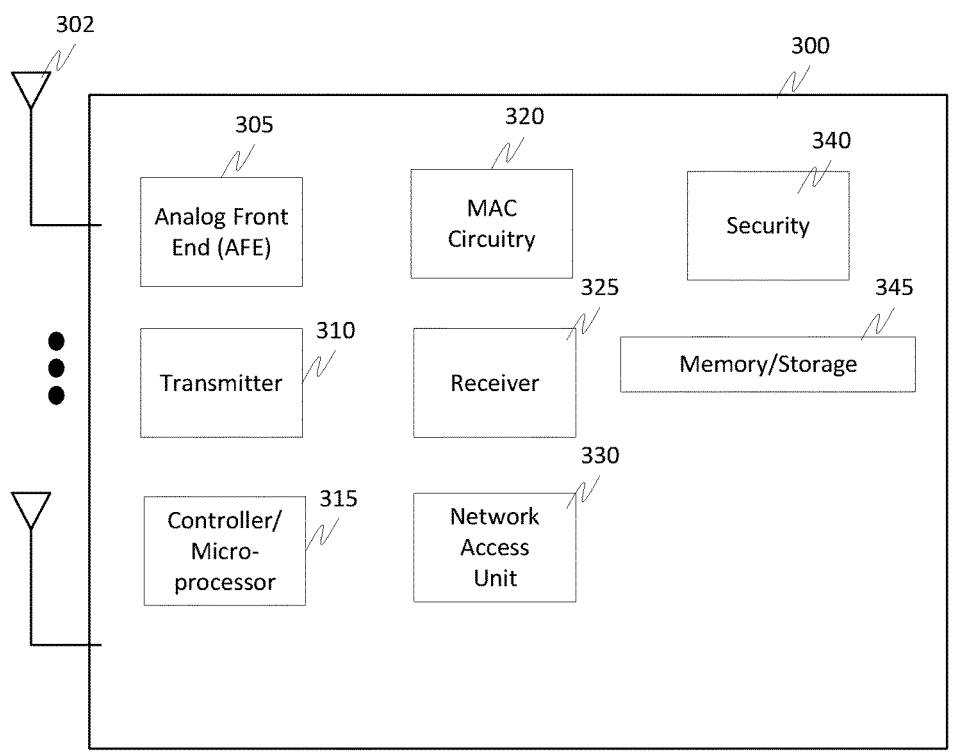
FIG. 3 illustrates a block diagram of an exemplary station.

Examples of the componentry in STAs and APs are shown in FIGS. 2-3, respectively. An example of a station (STA) architecture is shown in FIG. 2. The STA 200 may comprise hardware circuitry and/or software that conduct various operations. The STA 200 also includes conventional and well known components which have been omitted for clarity. The operations can include, but are not limited to, conducting calls, synchronizing with other APs, opening multiple applications, presenting information through audio and/or video means, communicating via a WLAN, etc. The STA 200 can be any type of computing/communication system operable to conduct the operations described here. As an example, the STA 200 can be a mobile phone, e.g., smartphone, which includes and interacts with various modules and components as shown in FIG. 2.

The STA 200 can have one more antennas 202, for use in wireless communications such as WLAN, multi-input multi-output (MIMO) communications, Bluetooth®, etc. The antennas 202 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users. The antennas at the STA and/or AP could also be a special type of antenna 202/302, e.g., a co-located dual-polarized antenna, which provides good isolation between transmission and reception to help mitigate the self-interference at the receiving chain.

Antennas 202 generally interact with an Analog Front End (AFE) module 205, which is needed to enable the correct processing of the received modulated signal and signal conditioning for a transmitted signal. The AFE 205 can be functionally located between the antenna and a digital baseband system in order to convert the analog signal into a digital signal for processing and vice-versa.

The STA 200 can also include a controller/microprocessor 215 and a memory/storage 245. The STA 200 can interact with the memory/storage 245 which may store information and operations necessary for configuring and transmitting or receiving the messages/information described herein. The memory/storage 245 may also be used in connection with the execution of application programming or instructions by the controller/microprocessor 215, and for temporary or long term storage of program instructions and/or data. As examples, the memory/storage 245 may comprise a computer-readable device, RAM, ROM, DRAM, SDRAM or other storage devices and media.

The controller/microprocessor 215 may comprise a general purpose programmable processor or controller for executing application programming or instructions related to the STA 200. Further, controller/microprocessor 215 can perform operations for configuring and transmitting messages/information as described herein. The controller/microprocessor 215 may include multiple processor cores, and/or implement multiple virtual processors. Optionally, the controller/microprocessor 215 may include multiple physical processors. By way of example, the controller/microprocessor 215 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The STA 200 can further include a transmitter 210 and receiver 225 which can transmit and receive signals, respectively, to and from other STAs or access points using the one or more antennas 202 and AFE 205. Included in the STA 200 circuitry is the medium access control or MAC/NAV (Media Access Control/Network Allocation Vector) circuitry 220. MAC/NAV circuitry 220 provides the medium for controlling access to the wireless medium. In an exemplary embodiment, the MAC/NAV circuitry 220 may be arranged to contend for a wireless medium and configure frames, packets, messages and/or information for communicating over the wireless medium.

The STA 200 can also contain a security module 240. This security module 240 can contain information regarding, but not limited to, security parameters required to connect the STA 200 to an AP or other available networks or network devices, and can include WEP or WPA/WPA-2 (optionally+ ABS and/or TKIP) security access keys, network keys, etc. A WEP security access key is a security password used by Wi-Fi networks. Knowledge of this code will enable the STA 200 to exchange information with an access point. The information exchange can occur through encoded messages with the WEP access code often being chosen by the network administrator. WPA is an added security standard that is also used in conjunction with network connectivity with stronger encryption than WEP.

Another module that the STA 200 can include is the network access unit 230. The network access unit 230 can be used for connecting with the AP. In one exemplary embodiment, connectivity can include synchronization between devices. In another exemplary embodiment, the network access unit 230 can work as a medium which provides support for communication with other stations. In yet another embodiment, the network access unit 230 can work in conjunction with at least the MAC/NAV circuitry 220. The network access unit 220 can also work and interact with one or more of the modules/components described herein.

The exemplary station 200 further includes an AS error rate determiner 250 and a DS error rate determiner 255 that may cooperate with one or more of the controller 215 and memory 245 to determine the antenna select and data stream error rates as discussed herein.

In accordance with some exemplary embodiments, the device 200 may include, among other things, physical (PHY) circuitry (not shown). The PHY circuitry and MAC circuitry 220 may be HEW compliant layers and may also be compliant with one or more legacy IEEE 802.11 standards. MAC circuitry 220 may be arranged to configure packets such as a physical layer convergence procedure (PLCP) protocol data unit (PPDUs) and arranged to transmit and receive PPDUs, among other things. The device 200 may also include the controller 215 and memory 245 configured to perform the various operations described herein. The controller 215 may be electrically coupled to the transceiver (transmitter 210/receiver 225), which may be coupled to the antenna(s) 202. While FIG. 2 depicts the processor and transceiver as separate components, the processor and transceiver may be integrated together in an electronic package or chip.

The PHY circuitry may be arranged to transmit a PPDU. The PHY circuitry may include circuitry for modulation/demodulation, upconversion/downconversion, filtering, amplification, etc. In some embodiments, the circuitry may include one or more processors. The circuitry may be configured to perform functions based on instructions being stored in a RAM or ROM, or based on special purpose circuitry. The circuitry may include processing circuitry and/or transceiver circuitry in accordance with some embodiments. The circuitry may include a processor such as a general purpose processor or special purpose processor. The circuitry may implement one or more functions associated with transmit/receive componentry discussed herein, the MAC circuitry, the AFE and/or the memory.

In some embodiments, the device/STA 200 may be configured to communicate using OFDM communication signals over a multicarrier communication channel. In some embodiments, the device 200 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described herein, although the scope of the invention is not limited in this respect, as they may also be suitable to transmit and/or receive communications in accordance with other techniques and standards.

In some embodiments, the device 200 may be part of a portable wireless communication device, such as a personal digital assistant (PDA), a laptop or portable computer with wireless communication capability, a tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

An example of an access point (AP) 300 architecture is shown in FIG. 3 and is similar to the embodiment described above in relation to FIG. 2. The AP 300 may comprise hardware circuitry and/or software that conduct various operations. The AP 300 also includes conventional and well known components which have been omitted for clarity. The operations can include, but are not limited to, conducting calls, synchronizing with other APs, opening multiple applications, presenting information through audio and/or video means, communicating via a WLAN, etc. The AP 300 can be any type of computing system operable to conduct the operations described here. As an example, the AP 300 can be a multi-channel, multi-mode access point which includes and interacts with various modules and components as shown in FIG. 3, as well as other communications device(s). The (wireless) access point (AP) is a device that can also allow wireless devices to connect to a wired network using Wi-Fi, or related standards. The AP usually connects to a router (via a wired network) as a standalone device, but it can also be an integral component of the router itself. The AP could also be a dual-band, managed or unmanaged, indoor or outdoor access point or bridge.

The AP 300 can have one more antennas 302, for use in wireless communications such as WLAN, multi-input multi-output (MIMO) communications, Bluetooth®, etc. The antennas 302 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

Antennas 302 generally interact with an Analog Front End (AFE) module 305, which is needed to enable the correct processing of the received modulated signal and signal conditioning for a transmitted signal. The AFE 305 can be functionally located between the antenna and a digital baseband system in order to convert the analog signal into a digital signal for processing and vice-versa.

The AP 300 can also include a controller/microprocessor 315 and a memory/storage 345. The AP 300 can interact with the memory/storage 345 which may store information and operations necessary for configuring and transmitting or receiving the messages/information described herein. The memory/storage 345 may also be used in connection with the execution of application programming or instructions by the controller/microprocessor 315, and for temporary or long term storage of program instructions and/or data. As examples, the memory/storage 345 may comprise a computer-readable device, RAM, ROM, DRAM, SDRAM or other storage devices and media.

The controller/microprocessor 315 may comprise a general purpose programmable processor or controller for executing application programming or instructions related to the AP 300. Further, controller/microprocessor 315 can perform operations for configuring and transmitting messages/information as described herein. The controller/microprocessor 315 may include multiple processor cores, and/or implement multiple virtual processors. Optionally, the controller/microprocessor 315 may include multiple physical processors. By way of example, the controller/microprocessor 315 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The AP 300 can further include a transmitter 310 and receiver 325 which can transmit and receive signals, respectively, to and from STAs or other access points using the one or more antennas 302 and AFE 305. Included in the AP 300 circuitry is the medium access control or MAC/NAV circuitry 320. MAC/NAV circuitry 320 provides the medium for controlling access to the wireless medium. In an exemplary embodiment, the MAC/NAV circuitry 320 may be arranged to contend for a wireless medium and configure frames, packets, messages and/or information for communicating over the wireless medium.

The AP 300 can also contain a security module 340. This security module 340 can contain information regarding, but not limited to, security parameters required to connect the AP 300 to another AP or other available networks or network devices, and can include WEP or WPA security access keys, network keys, etc., as discussed.

Another module that the AP 300 can include is the network access unit 330. The network access unit 330 can be used for connecting with another network device. In one exemplary embodiment, connectivity can include synchronization between devices. In another exemplary embodiment, the network access unit 330 can work as a medium which provides support for communication with other stations. In yet another embodiment, the network access unit 330 can work in conjunction with at least the MAC/NAV circuitry 320. The network access unit 320 can also work and interact with one or more of the modules/components described herein.

The exemplary AP 300 may further includes an AS error rate determiner and a DS error rate determiner (not shown) that may cooperate with one or more of the controller 315 and memory 345 to determine the antenna select and data stream error rates as discussed herein.

Figure 4:
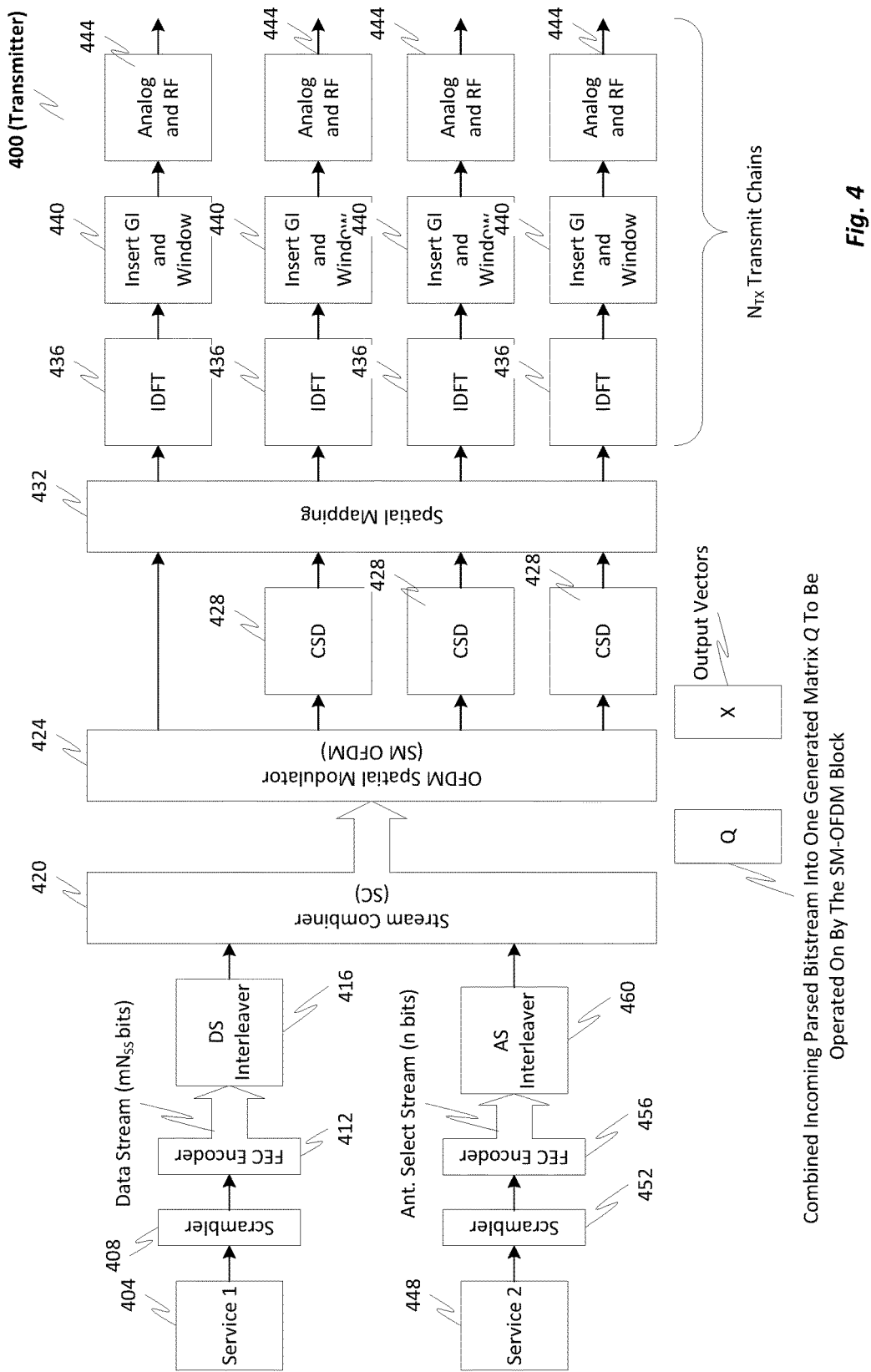
FIG. 4 illustrates in greater detail the transmitter portion of an improved wireless communications device.

FIG. 4 illustrates in greater detail an exemplary transmitter block diagram of the transmitter portion of FIGS. 2 and/or 3 that can be used, for example, in IEEE 802.11.ax/ax+. This new transmitter design for the SM-OFDMA enables, for example, different source-encoded data services with different QOS on each information category. As discussed, this configuration exploits the different QOS behavior for each information category to selectively enhance transmission robustness in applications where different bits have different significance.

The new design also enables, for example, providing of similar error performance for the two information categories when different services, or PHY QOS are not required. In particular, FIG. 4 illustrates in greater detail the transmitter and analog front end componentry as shown in FIGS. 2-3.

More specifically, the transmitter 400 componentry includes service one 404, scrambler 408, FEC encoder 412, data stream interleaver 416, stream combiner 420, OFDM spatial modulator 424, a plurality of cyclic shift diversity (CSD) elements 432, a plurality of inverse discrete Fourier transforms (IDFT) 436, and the analog portions of the transmission chain such as the insert GI and window componentry 440 and the analog and RF componentry 444. The transmitter 400 further includes a second service 448, scrambler 452, FEC encoder 456, and an antenna select interleaver 460, used for the second service and the antenna select stream.

The insert GI and window 440 inserts the guard interval and provides optional windowing which smoothes the edges of each symbol to increase spectral decay.

The exemplary transmitter 400 includes separate paths for each data service, here service one 404 and service two 448. The incoming source-encoded data from each service will pass through a respective scrambler (408, 452), and then a separate forward error correction (FEC) encoder (412, 456) to generate the data and the antenna selection streams. The data stream will be designated as (mNSS bits) and the antenna selection stream will have n bits. Each of these two different streams represent different source-encoded data services with different priorities. The data stream from service 1 404 is forwarded to a data stream interleaver 416, while the antenna selection stream from service 2 448 is forwarded from the FEC encoder 456 to the antenna stream interleaver 460. The interleaved encoded data (i.e., antenna selection bits and data bits) represent the prioritized data category (high priority-HP or low priority-LP) to be transmitted using SM-OFDMA.

The stream combiner 420, upon receipt of the interleaved streams, combines the incoming bits streams into a generated matrix Q that will be operated on by the OFDM spatial modulator 424. Spatial modulator 424 outputs vectors which are simultaneously applied to the cyclic shift diversity components 428, spatial mapping 432, and inverse discrete Fourier transform blocks 436 before passing through the analog part of the transmission chain (insert guard interval and window 440 and analog and RF componentry 444) before passing to the antenna(s).

It is important to note that in accordance with one exemplary embodiment the hardware complexity of the transmitter 400 is not higher than that of existing IEEE 802.11ac transmitters. In IEEE 802.11ac, the multiple FEC encoders are already used for other matters, however the same hardware can be used to enable the new features proposed herein. This can be especially advantageous in that the newly proposed transmitter does not necessarily add any new hardware complexity. In addition, the exemplary design allows for different channel encoding rates for each category which allows the two streams to have similar error performance using different coding rates and parameters for each FEC encoder associated with each service. Moreover, the transmitter 400 saves hardware complexity from the SM-OFDM transmitter design by optionally removing the bit parser. Hence, the hardware becomes less complex as the operation of the bit parser block can be implicitly performed by the different source-encoded data services.

The error performance of each information category in spatial modulation is determined as follows:

The error rate of the antenna selection (AS) information category is determined by the antenna correlation coefficients and the LOS component. Hence, if either the antenna correlation coefficient or the LOS component are large, the AS error performance will be poor, and vice versa.

The error performance of the complex signal constellation (DS) is determined by the minimum Euclidean distance between a pair of signal points. Hence, if the minimum Euclidean distance is small, the DS error performance will be poor, and vice versa.

As another option, in a situation where the selection for which service is mapped could be done by lookup based on MCS (Modulation and Coding Scheme) exclusively. And as a second level, MCS plus location (so if the system knows the device is out in an urban area, or if downtown.) This selection could also be performed a priori.

As discussed, the performance of the AS and DS bit steams are different and varied based on antenna correlation coefficients, the LOS components, and the minimum Euclidean distance among constellation points. As the correlation between the antennas increases or the LOS component gets larger, the AS performance degrades. For DS, the performance decreases when the Euclidean distance gets smaller. For this situation, the transmitter 400 can adjust and rearrange the incoming scrambled bit streams for LP information (less delay sensitive or performance improving data part) versus HP information (delay sensitive or QOS-constrained).

As an example, one can consider a video streaming service in which the data packets can be divided into two categories: the HP (delay sensitive or QOS-constrained) and the LP information categories (less delay sensitive or performance improving data part, such as, high definition (HD) data portion). Hence, the robust reception of the HP information part is sufficient to get a relatively good video streaming quality, while the LP information part (the HD portion in the video example) can be used to enhance the streaming quality.

One embodiment discloses modifications to IEEE 802.11 transmitter blocks along with some new transmitter blocks to enable a design of the MIMO/OFDM waveform to provide significant advantages in cases where client devices have different bit streams with different significance, i.e., HP and LP. One exemplary embodiment provides a transmission method that improves the overall network reliability by transmitting the higher priority data on the more reliable constellation, either the spatial or the signal constellation based on the channel environment and antenna design. An exemplary embodiment can be applied to Wi-Fi and the architecture to support this implementation is disclosed herein.

Exemplary embodiments can also be extended to 5G, LTE, cellular networks, and the like.

Figure 5:
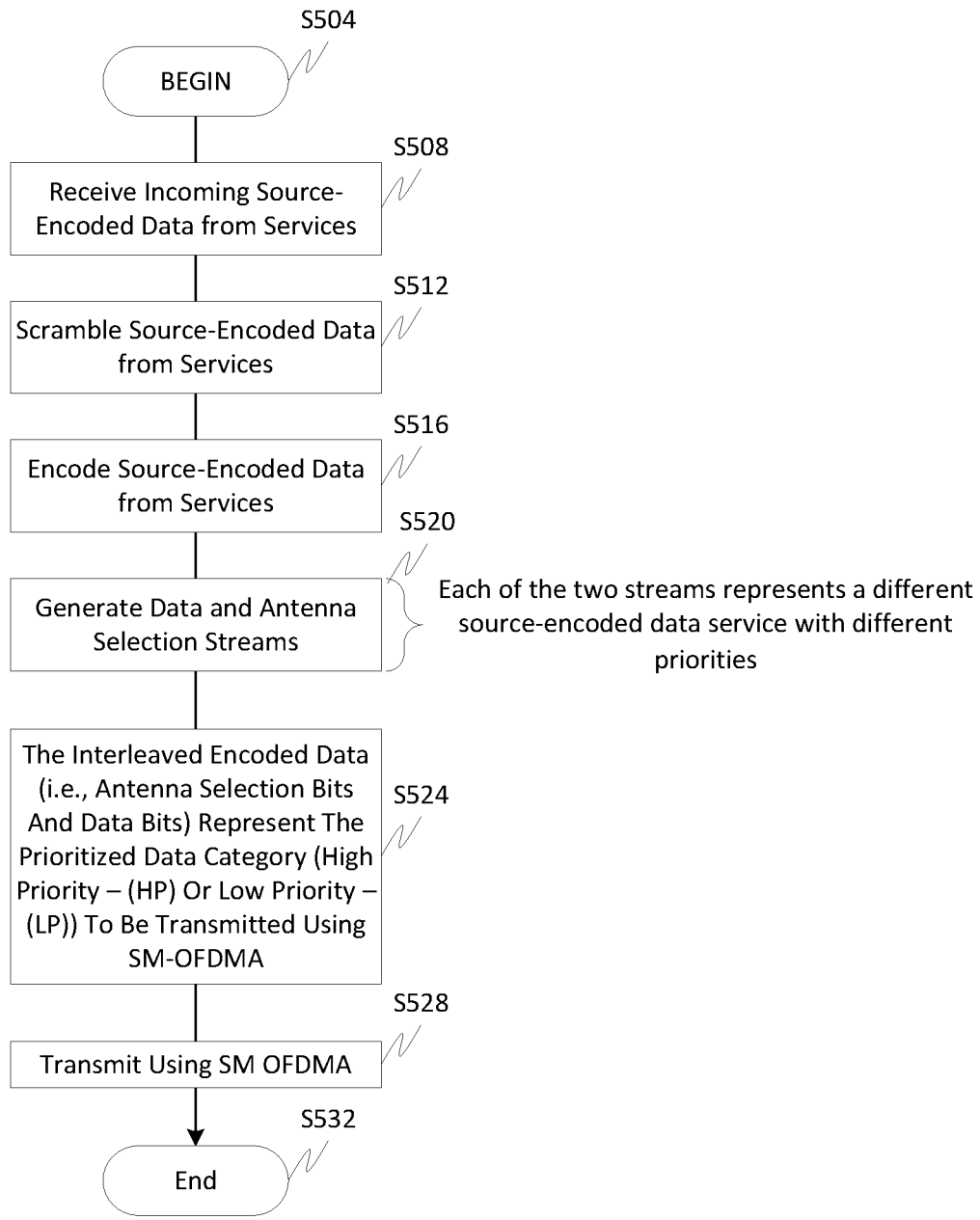
FIG. 5 is a flowchart illustrating an exemplary method for encoding and transmitting data from different services.

FIG. 5 illustrates an exemplary embodiment of encoding and transmitting different source-encoded data service with different priorities. In particular, control begins in step S504 and continues to S508. In step S508, incoming source-encoded data from two or more services is received. Next, in step S512, the source-encoded data from two or more services is scrambled. Then, in step S516, the source-encoded data from the two or more services is encoded. Control then continues to step S520.

In step S520, the data and antenna selection streams are generated. Next, in step S524, the interleaved encoded data represent the prioritized data category to be transmitted using SM-OFDMA. Control then continues to step S528 where the encoded data is transmitted using SM-OFDMA with control continuing to step S532 where the control sequence ends.

Figure 6:
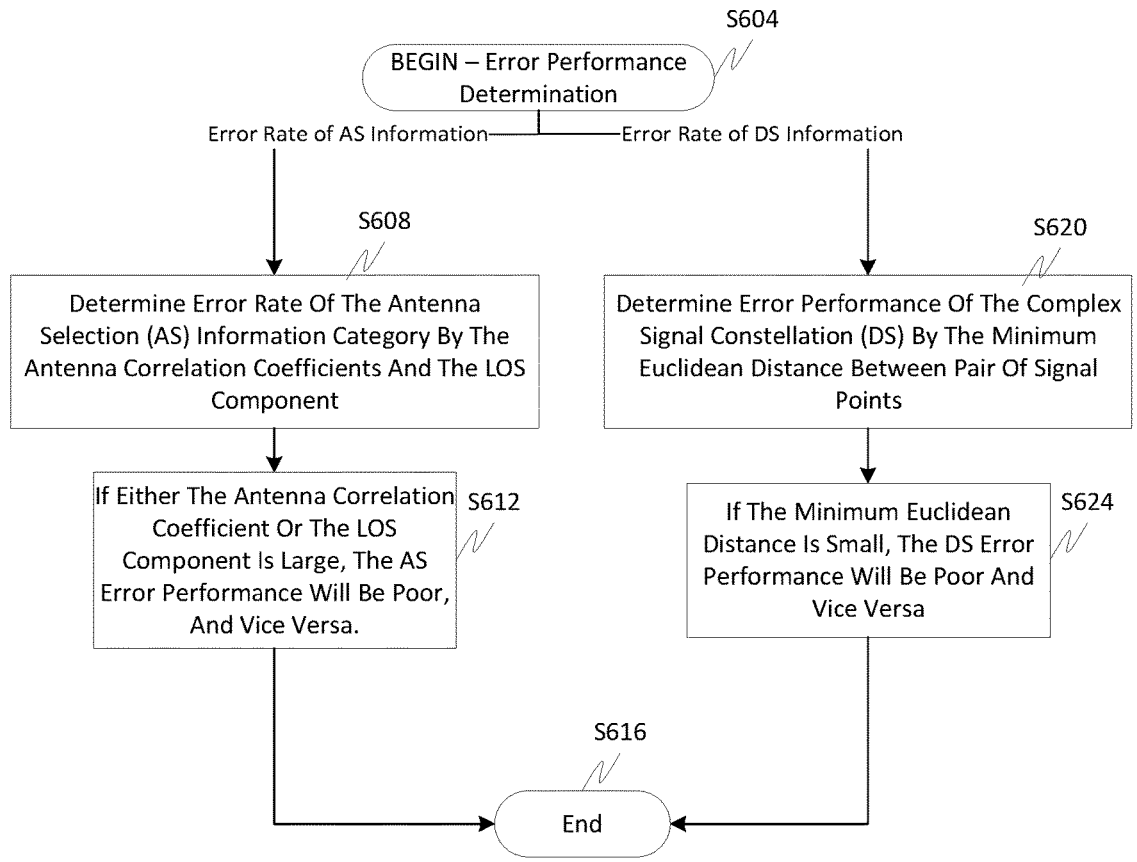
FIG. 6 is a flowchart illustrating an exemplary method for determining error performance.

FIG. 6 outlines an exemplary method for error performance determination. In particular, control begins to step S604 and continues to either step S608 for determining the error rate of antenna selection information, or to step S620 for determining the error rate of the complex signal constellation.

In step S608, the error rate of the antenna selection (AS) information category is determined by the antenna correlation coefficients and the LOS component.

As one example, for antenna correlation, a pre-measurement could be made at the "factory" where the device is assembled/tested, and during auto calibration, the factory could make measurements and get the antenna correlation. As another option especially useful for handheld devices, where the antenna correlation could change, the system could measure known signals and perform a more long term averaging. As yet another option, also usable for Wi-Fi, the measurement could be done with the STF/LTF in the preamble. The LOS can be attained from the STF/LTF during channel estimation.

Control then continues to step S612 where, if either the antenna correlation coefficient or the LOS component is large, the AS error performance will be poor, and vice versa. Control then continues to step S616 where the control sequence ends.

In step S620, and for the DS information error rate determination, the error performance of the complex signal constellation (DS) is determined by the minimum Euclidean distance between a pair of signal points.

This can be performed in accordance with one exemplary embodiment based on the MCS chosen to transmit, so it can be essentially a look-up table based on the transmitted MCS that is desired to be used, i.e., the Euclidean distance is small for high order modulation compared to lower, for instance 64 QAM the distance is smaller than for say QPSK. Thus, the system could do the selection based on transmit parameters (MCS and measured antenna correlation—for example, either a factory setting or some time averaging of other signals).

Next, in step S624, if the minimum Euclidean distance is small, the DS error performance will be poor, and vice versa. Control then continues to step S616 where the control sequence ends.

While the techniques discussed herein have been specifically discussed in relation to IEEE 802.11 systems, it should be appreciated that the techniques discussed herein can generally be applicable to any type of wireless communication standard, protocol, and/or equipment. Moreover, all the flowcharts have been discussed in relation to a set of exemplary steps, it should be appreciated that some of these steps could be optional and excluded from the operational flow without affecting the success of the technique. Additionally, steps provided in the various flowcharts illustrated herein can be used with other techniques illustrated herein.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein.

Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

It should also be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MD3, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links (which may not be shown connecting the elements), including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to 802.11 communications. However, it should be appreciated, that in general, the systems and methods herein will work equally well for any type of communication system in any environment utilizing any one or more protocols including wired communications, wireless communications, power-line communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the description omits well-known structures and devices that may be shown in block diagram form or otherwise summarized.

Exemplary aspects are directed toward:
A wireless system, comprising:
  a transmitter including:
    at least one scrambler configured to receive information from at least two different data services, the two different data services having two different priorities,
    at least one forward error correction encoder configured to generate a data stream and an antenna selection stream from the two different data services,
    a data stream interleaver configured to interleave the data stream,
    an antenna selection interleaver configured to interleave the antenna selection stream, and
    an OFDM spatial modulator configured to transmit the interleaved data stream and the interleaved antenna selection stream.
Any one or more of the above aspects, further comprising one or more of an analog front end, a security module, a controller, memory, one or more antennas, MAC circuitry, a receiver, and a network access unit.
Any one or more of the above aspects, further comprising one or more cyclic shift diversity (CSD) elements connected to the OFDM spatial modulator.
Any one or more of the above aspects, further comprising one or more inverse discrete Fourier transform elements, one or more insert guard interval and window elements and one or more analog and RF components.
Any one or more of the above aspects, further comprising a stream combiner configured to receive the interleaved data stream and the interleaved antenna selection stream.
Any one or more of the above aspects, further comprising a spatial mapping module configured to receive output from one or more cyclic shift diversity elements.
Any one or more of the above aspects, further comprising an antenna select error rate determiner configured to determine an error rate of the antenna selection stream using antenna correlation coefficients and a line-of-site component.
Any one or more of the above aspects, further comprising a data stream error rate determiner configured to determine an error rate of the data stream using a minimum Euclidean distance between
Any one or more of the above aspects, wherein the antenna selection stream corresponds to high priority or low priority transmissions, and a high power or a low power stream is mapped to the antenna selection stream based on known information, including one or more of modulation order transmitted, measured and previously used signals for antenna correlation.
Any one or more of the above aspects, wherein the data stream corresponds to high priority or low priority transmissions and a high power or a low power stream is mapped to a modulation/data selection stream based on known information, including one or more of modulation order transmitted, measured and previously used signals for antenna correlation.
A method of operating a wireless communications device comprising:
  receiving and scrambling information from at least two different data services, the two different data services having two different priorities,
  generating, by a forward error corrector, a data stream and an antenna selection stream from the two different data services,
  interleaving the data stream,
  interleaving the antenna selection stream, and
  transmitting, by a transmitter, the interleaved data stream and the interleaved antenna selection stream.
Any one or more of the above aspects, wherein the wireless communications device comprises one or more of an analog front end, a security module, a controller, memory, one or more antennas, MAC circuitry, a receiver, and a network access unit.
Any one or more of the above aspects, further comprising performing a cyclic shift and an OFDM spatial modulation.
Any one or more of the above aspects, further comprising performing an inverse discrete Fourier transforms and inserting a guard interval.
Any one or more of the above aspects, further comprising receiving the interleaved data stream and the interleaved antenna selection stream.
Any one or more of the above aspects, further comprising receiving output from one or more cyclic shift diversity elements.
Any one or more of the above aspects, further comprising determining an error rate of the antenna selection stream using antenna correlation coefficients and a line-of-site component.
Any one or more of the above aspects, further comprising determining an error rate of the data stream using a minimum Euclidean distance between
Any one or more of the above aspects, wherein the antenna selection stream corresponds to high priority or low priority transmissions, and a high power or a low power stream is mapped to the antenna selection stream based on known information, including one or more of modulation order transmitted, measured and previously used signals for antenna correlation.
Any one or more of the above aspects, wherein the data stream corresponds to high priority or low priority transmissions and a high power or a low power stream is mapped to a modulation/data selection stream based on known information, including one or more of modulation order transmitted, measured and previously used signals for antenna correlation.
Any one or more of the above aspects, further comprising selecting a priority based on one or more transmit parameters.
A non-transitory computer-readable information storage media, having stored thereon instructions, that when executed by a processor, perform a method for operating a transmitter, comprising:

receiving and scrambling information from at least two different data services, the two different data services having two different priorities,
  generating, by a forward error corrector, a data stream and an antenna selection stream from the two different data services,
  interleaving the data stream,
  interleaving the antenna selection stream, and
  transmitting, by a transmitter, the interleaved data stream and the interleaved antenna selection stream.
Any one or more of the above aspects, wherein the wireless communications device comprises one or more of an analog front end, a security module, a controller, memory, one or more antennas, MAC circuitry, a receiver, and a network access unit.
Any one or more of the above aspects, further comprising performing a cyclic shift and an OFDM spatial modulation.
Any one or more of the above aspects, further comprising performing an inverse discrete Fourier transforms and inserting a guard interval.
Any one or more of the above aspects, further comprising receiving the interleaved data stream and the interleaved antenna selection stream.
Any one or more of the above aspects, further comprising receiving output from one or more cyclic shift diversity elements.
Any one or more of the above aspects, determining an error rate of the antenna selection stream using antenna correlation coefficients and a line-of-site component.
Any one or more of the above aspects, further comprising determining an error rate of the data stream using a minimum Euclidean distance between
Any one or more of the above aspects, wherein the antenna selection stream corresponds to high priority or low priority transmissions, and a high power or a low power stream is mapped to the antenna selection stream based on known information, including one or more of modulation order transmitted, measured and previously used signals for antenna correlation.
Any one or more of the above aspects, wherein the data stream corresponds to high priority or low priority transmissions and a high power or a low power stream is mapped to a modulation/data selection stream based on known information, including one or more of modulation order transmitted, measured and previously used signals for antenna correlation.
Any one or more of the above aspects, further comprising selecting a priority based on one or more transmit parameters.
A wireless system, comprising:
  means for receiving and means for scrambling information from at least two different data services, the two different data services having two different priorities,
  means for generating, by a forward error corrector, a data stream and an antenna selection stream from the two different data services,
  means for interleaving the data stream,
  means for interleaving the antenna selection stream, and
  means for transmitting the interleaved data stream and the interleaved antenna selection stream.
Any one or more of the above aspects, wherein the wireless communications device comprises one or more of an analog front end, a security module, a controller, memory, one or more antennas, MAC circuitry, a receiver, a transmitter and a network access unit.
Any one or more of the above aspects, further comprising means for performing a cyclic shift and an OFDM spatial modulation.
Any one or more of the above aspects, further comprising means for performing an inverse discrete Fourier transforms and inserting a guard interval.
Any one or more of the above aspects, further comprising means for receiving the interleaved data stream and the interleaved antenna selection stream.
Any one or more of the above aspects, further comprising means for receiving output from one or more cyclic shift diversity elements.
Any one or more of the above aspects, further comprising means for determining an error rate of the antenna selection stream using antenna correlation coefficients and a line-of-site component.
Any one or more of the above aspects, further comprising determining an error rate of the data stream using a minimum Euclidean distance between
Any one or more of the above aspects, wherein the antenna selection stream corresponds to high priority or low priority transmissions, and a high power or a low power stream is mapped to the antenna selection stream based on known information, including one or more of modulation order transmitted, measured and previously used signals for antenna correlation.
Any one or more of the above aspects, wherein the data stream corresponds to high priority or low priority transmissions and a high power or a low power stream is mapped to a modulation/data selection stream based on known information, including one or more of modulation order transmitted, measured and previously used signals for antenna correlation.
Any one or more of the above aspects, further comprising means for selecting a priority based on one or more transmit parameters.
Any one or more of the aspects as substantially disclosed herein.

For purposes of explanation, numerous details are set forth in order to provide a thorough understanding of the present embodiments. It should be appreciated however that the techniques herein may be practiced in a variety of ways beyond the specific details set forth herein.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, WiFi, LTE, 4G, Bluetooth®, WirelessHD, WiGig, WiGi, 3GPP, Wireless LAN, WiMAX, LiFi, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Provided herein are exemplary systems and methods for an improved spatial modulation technique and transmitter. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless system, comprising:
a transmitter including:
at least one scrambler configured to receive information from at least two different data services, the two different data services having two different priorities,
at least one forward error correction encoder configured to generate in parallel a data stream and an antenna selection stream from the two different data services,
a data stream interleaver in parallel with an antenna selection interleaver, the data stream interleaver configured to interleave the data stream,
the antenna selection interleaver configured to interleave the antenna selection stream, the antenna selection stream having a determined error rate, and
an OFDM spatial modulator configured to transmit the interleaved data stream and the interleaved antenna selection stream.

2. The system of claim 1, further comprising one or more of an analog front end, a security module, a controller, memory, one or more antennas, MAC circuitry, a receiver, and a network access unit.

3. The system of claim 1, further comprising one or more cyclic shift diversity (CSD) elements connected to the OFDM spatial modulator.

4. The system of claim 1, further comprising one or more inverse discrete Fourier transform elements, one or more insert guard interval and window elements and one or more analog and RF components.

5. The system of claim 1, further comprising a stream combiner configured to receive the interleaved data stream and the interleaved antenna selection stream.

6. The system of claim 1, further comprising a spatial mapping module configured to receive output from one or more cyclic shift diversity elements.

7. The system of claim 1, wherein the antenna selection stream corresponds to high priority or low priority transmissions, and a high power or a low power stream is mapped to the antenna selection stream based on known information, including one or more of modulation order transmitted, measured and previously used signals for antenna correlation.

8. The system of claim 1, wherein the data stream corresponds to high priority or low priority transmissions and a high power or a low power stream is mapped to a modulation/data selection stream based on known information, including one or more of modulation order transmitted, measured and previously used signals for antenna correlation.

9. A wireless system, comprising:
a transceiver including:
    at least one scrambler configured to receive information from at least two different data services, the two different data services having two different priorities,
    at least one forward error correction encoder configured to generate a data stream and an antenna selection stream from the two different data services,
    a data stream interleaver configured to interleave the data stream,
    an antenna selection interleaver configured to interleave the antenna selection stream,
    an OFDM spatial modulator configured to transmit the interleaved data stream and the interleaved antenna selection stream, and
    an antenna select error rate determiner configured to determine an error rate of the antenna selection stream using antenna correlation coefficients and a line-of-site component.

10. A wireless system, comprising:
a transceiver including:
    at least one scrambler configured to receive information from at least two different data services, the two different data services having two different priorities,
    at least one forward error correction encoder configured to generate a data stream and an antenna selection stream from the two different data services,
    a data stream interleaver configured to interleave the data stream,
    an antenna selection interleaver configured to interleave the antenna selection stream,
    an OFDM spatial modulator configured to transmit the interleaved data stream and the interleaved antenna selection stream, and
a data stream error rate determiner configured to determine an error rate of the data stream using a minimum Euclidean distance between pairs of signal points for data bits.

11. A method of operating a wireless communications device comprising:
receiving and scrambling information from at least two different data services, the two different data services having two different priorities,
generating, by a forward error corrector, and in parallel, a data stream and an antenna selection stream from the two different data services,
interleaving the data stream,
interleaving, in parallel with the data stream, the antenna selection stream, the antenna selection stream having a determined error rate, and
transmitting, by a transmitter, the interleaved data stream and the interleaved antenna selection stream.

12. The method of claim 11, wherein the wireless communications device comprises one or more of an analog front end, a security module, a controller, memory, one or more antennas, MAC circuitry, a receiver, and a network access unit.

13. The method of claim 11, further comprising performing a cyclic shift and an OFDM spatial modulation.

14. The method of claim 11, further comprising performing an inverse discrete Fourier transforms and inserting a guard interval.

15. The method of claim 11, further comprising receiving the interleaved data stream and the interleaved antenna selection stream.

16. The method of claim 11, further comprising receiving output from one or more cyclic shift diversity elements.

17. The method of claim 11, wherein the antenna selection stream corresponds to high priority or low priority transmissions, and a high power or a low power stream is mapped to the antenna selection stream based on known information, including one or more of modulation order transmitted, measured and previously used signals for antenna correlation.

18. The method of claim 11, wherein the data stream corresponds to high priority or low priority transmissions and a high power or a low power stream is mapped to a modulation/data selection stream based on known information, including one or more of modulation order transmitted, measured and previously used signals for antenna correlation.

19. The method of claim 11, further comprising selecting a priority based on one or more transmit parameters.

20. A method of operating a wireless communications device comprising,
receiving and scrambling information from at least two different data services, the two different data services having two different priorities,
generating, by a forward error corrector, a data stream and an antenna selection stream from the two different data services,
interleaving the data stream,
interleaving the antenna selection stream,
transmitting, by a transmitter, the interleaved data stream and the interleaved antenna selection stream, and
determining an error rate of the antenna selection stream using antenna correlation coefficients and a line-of-site component.

21. A method of operating a wireless communications device comprising,
receiving and scrambling information from at least two different data services, the two different data services having two different priorities,
generating, by a forward error corrector, a data stream and an antenna selection stream from the two different data services,
interleaving the data stream,
interleaving the antenna selection stream,
transmitting, by a transmitter, the interleaved data stream and the interleaved antenna selection stream, and
determining an error rate of the data stream using a minimum Euclidean distance between pairs of signal points for data bits.

22. A non-transitory computer-readable information storage media, having stored thereon instructions, that when executed by a processor, perform a method for operating a transmitter, comprising:

receiving and scrambling information from at least two different data services, the two different data services having two different priorities, generating, by a forward error corrector, and in parallel, a data stream and an antenna selection stream from the two different data services, interleaving the data stream, interleaving, in parallel with the data stream, the antenna selection stream, the antenna selection stream having a determined error rate, and transmitting, by a transmitter, the interleaved data stream and the interleaved antenna selection stream.

\* \* \* \* \*

UNITED STATES PATENT AND TRADEMARK OFFICE
CERTIFICATE OF CORRECTION

PATENT NO. : 9,614,708 B1
APPLICATION NO. : 14/976271
DATED : April 4, 2017
INVENTOR(S) : Ahmed Gamal Helmy Mohamed et al.

Page 1 of 1

It is certified that error appears in the above-identified patent and that said Letters Patent is hereby corrected as shown below:

At Column 1, Line 26, delete "(TOT)" and insert -- (IOT) --, therefore.

At Column 5, Line 25, delete "ABS" and insert -- AES --, therefore.

At Column 8, Line 41, delete "smoothes" and insert -- smooths --, therefore.

At Column 12, Line 43, delete "MD3," and insert -- MIB --, therefore.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*